Patented Mar. 16, 1948

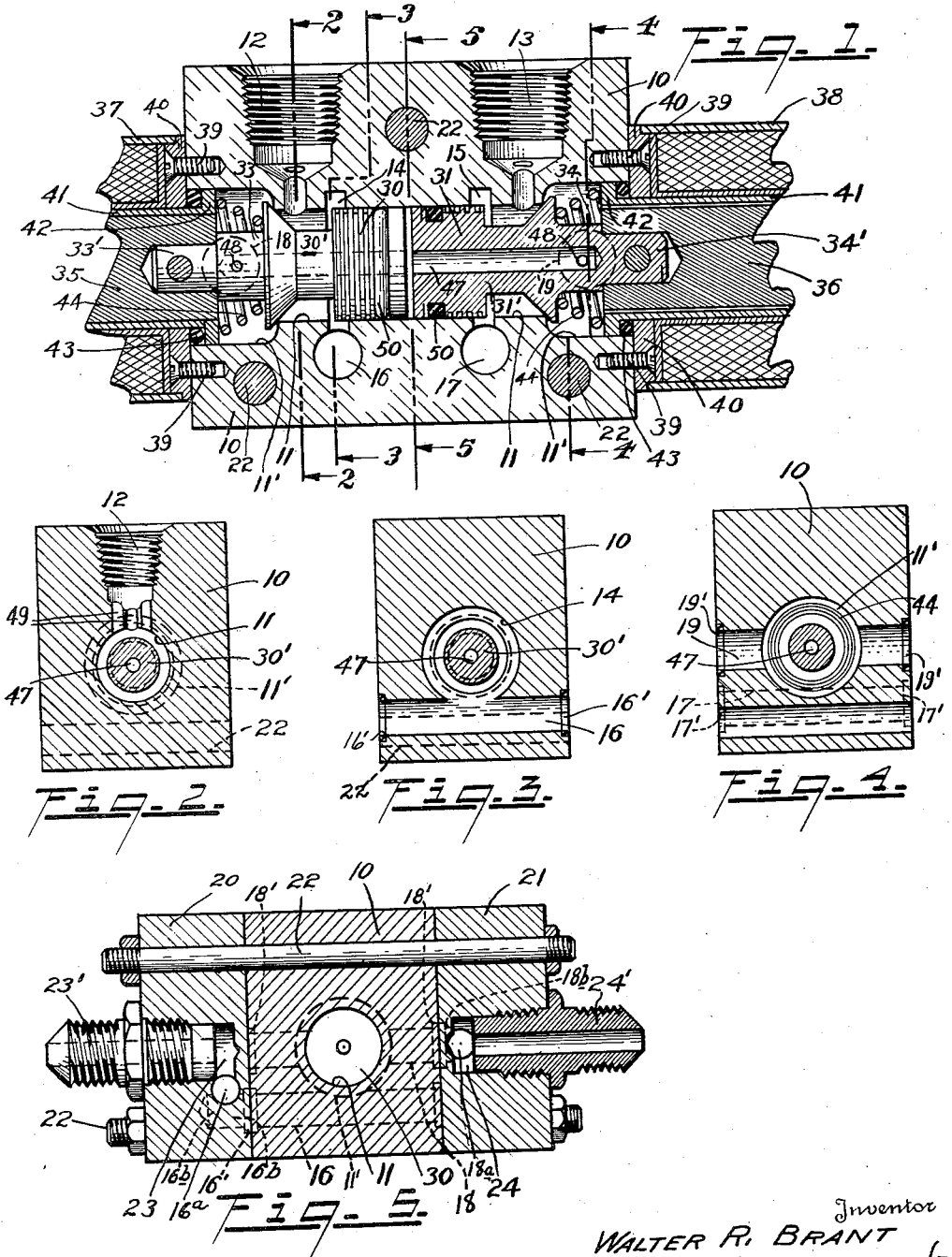

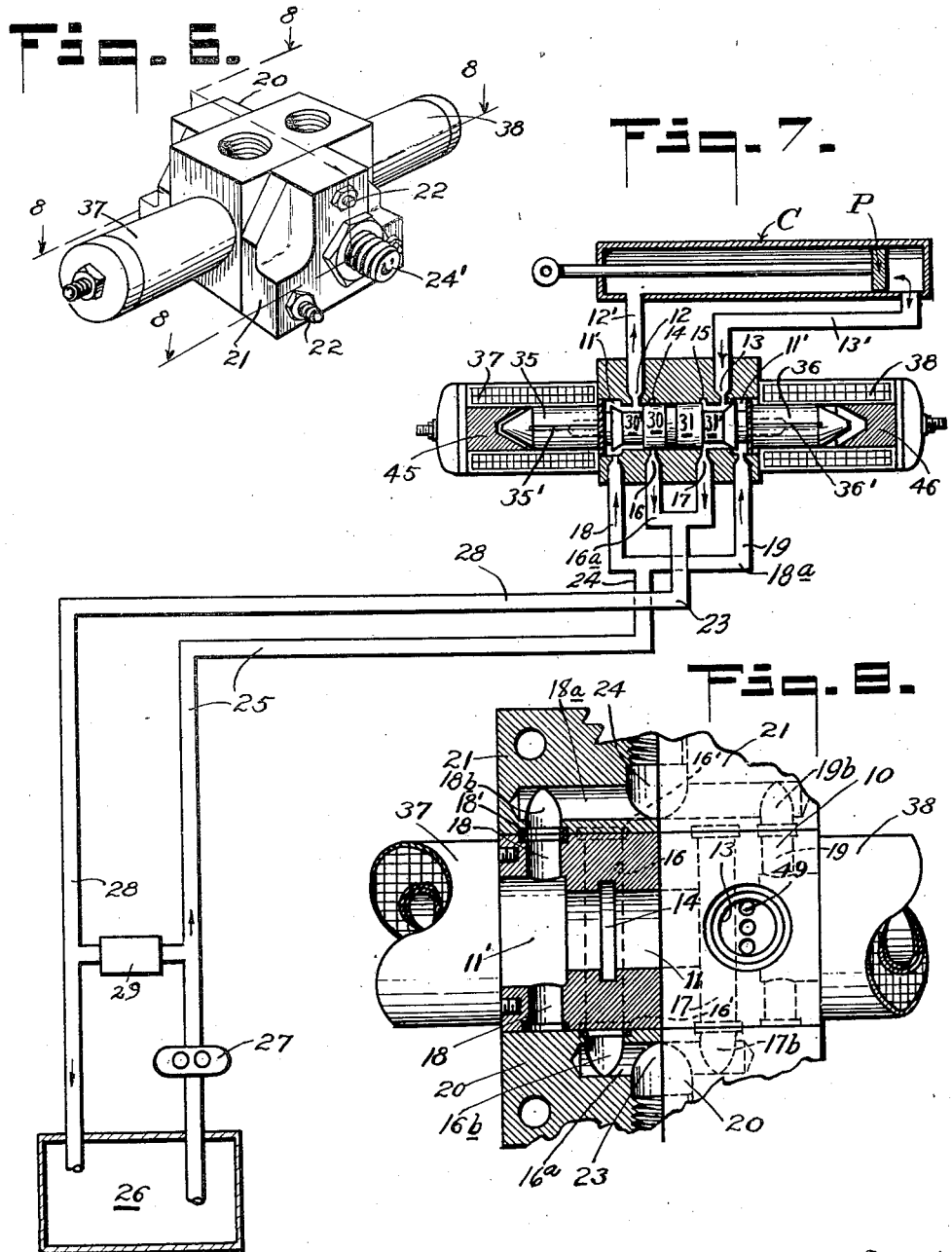

2,437,723

UNITED STATES PATENT OFFICE 2,437,723

POPPET VALVE

Walter R. Brant and Harvey G. Chapman, Jr., Glendale, Calif., assignors to Adel Precision Products Corp., a corporation of California Application December 4, 1944, Serial No. 566,598

8 Claims. (Cl. 137—144)

This invention relates to poppet valves, and more particularly to electrically operated valves of the poppet type, and it has among its salient objects to provide a valve of the poppet type which is fully balanced and which is normally open to the return side of a hydraulic system, whereby either of two poppet valves in the lines leading to the opposite ends of an operating cylinder can be moved independently of each other, with the consequent reduction in the amount of energy required in the solenoid moving the same; to provide a valve of the poppet type wherein the matter of manufacture, repair and replacement are greatly facilitated; to provide a valve structure which makes possible the "stacking" of a plurality of such valves for manifolding purposes, whereby with a single pressure line, and also a single return line, common to all, can be used; to provide an electrically controlled valve of the character referred to which is highly efficient in connection with reversible hydraulic motors, in that operation of one poppet valve will effect movement of a hydraulic motor in one direction, while the operation of the other poppet valve will effect movement of said hydraulic motor in the opposite direction; to provide a valve of the character referred to in which there are no parts extended through the body or housing to require packing in order to avoid possible leakage, and, in general, to provide a valve of the character referred to which is practical, simple and economical to make and to operate.

In order to illustrate and explain our invention, we have shown one embodiment thereof on the accompanying two sheets of drawings, in which:

Fig. 1 is a longitudinal sectional view through a valve embodying our invention, with parts of the operating solenoids broken away to reduce the size of the view;

Figs. 2, 3 and 4 are cross sectional views, taken respectively, on the lines 2—2, 3—3 and 4—4, on Fig. 1;

Fig. 5 is a cross sectional view taken on the line 5—5 of Fig. 1;

Fig. 6 is a perspective view of the complete valve structure;

Fig. 7 is a schematic view showing a valve embodying our invention in longitudinal section, connected with a source of operating fluid, and also connected with an operating cylinder, shown in section, and showing an operating piston therein; and Fig. 8 is an enlarged fragmentary view, partly in section, taken on the line 8—8 of Fig. 6.

Referring in detail to the drawings, the invention as here embodied for illustrative purposes, includes a body 10, having therein a cylindrical bore 11, with its opposite ends enlarged to form valve chambers 11', 11'. Said body is also provided with two main connection ports, as 12 and 13, for connection with the opposite ends of an operating cylinder, as C, Fig. 7, with an operating piston P therein, and again referred to.

Said body is also provided around said bore 11, with two annular, inwardly opening channels, as 14 and 15 and with two transverse passageways, as 16 and 17, with which said annular channels 14 and 15 connect, respectively, as seen in Fig. 3, taken on the line 3—3 of said Fig. 1. Said passageways 16 and 17 have gaskets in counterbores 16' and 17' at their junctures with means hereinafter described affording connection with the return line of a hydraulic system.

Said body is also provided with two ports 18 and 19, extending transversely through said body one of which, 19 is seen in Fig. 4, and both are indicated in broken circles in Fig. 1, and connected with valve chambers 11', 11' said ports at the exterior of the body 10 terminate in counterbores 18' and 19' for the reception of sealing gaskets.

Said body is so constructed that two end plates, as 20 and 21, can be connected thereto, and held in place by bolts, as 22. The plate 20 is provided with a transverse port 23 provided at one end with a fitting 23', affording a means of connection with the return line of a hydraulic system and at its other end the port 23 intersects the mid portion of a channel 16ª which channel at its ends communicates with ports 16ᵇ and 17ᵇ which are disposed in registry with the ports 16 and 17 and are provided with corresponding gasket-receiving counterbores. The plate 21 is provided with a port 24 which at one end is provided with a fitting 24' affording a means of connection with the pressure line of a hydraulic system and at its other end the port 24 intersects the mid-portion of a transverse channel 18ª, which channel at its opposite ends communicates with ports 18ᵇ and 19ᵇ which are disposed in registry with ports 18 and 19 respectively and are provided with corresponding gasket-receiving counterbores.

Referring to the schematic showing in Fig. 7, a pressure line 25 of a hydraulic system is connected with the port 24 with a source of fluid supply 26 with an interposed pump 27, while a return line 28 extends between the port 23 and the supply 26. Additionally, a pressure relief valve 29 is interposed between the lines 25 and 28.

Thus it will be seen that hydraulic fluid from the source of supply, represented by 26, can be forced through the pipe 25 and to the opposite valve chambers 11', 11' of the bore 11, and subject to the positions of the valve members 30 and 31, will be conveyed to and from the opposite ends of the operating cylinder C, through the pipes 12' and 13' connecting the opposite ends of said cylinder C, with the main ports 12 and will be returned through pipe 28 and 13.

We will now describe the valve members 30 and 31, in the valve chambers 11', 11', and which are independently operated in the control of the hydraulic fluid to and from the operating cylinder C.

Said valve members 30 and 31 are alike and are in the nature of combined poppet and spool valves. As shown in the drawings, each has a reduced diameter, as at 30' and 31', forming a spool-like end on each, with a cylindrical end extension on each, designated, respectively, 33 and 34, Fig. 1, and with smaller ends 33' and 34', which are shown connected with the armatures 35 and 36, respectively, of two solenoids 37 and 38, which are secured to the opposite ends of the body 10, as by means of screw bolts 39, 39, and a connecting ring 40, a construction also shown in a companion application, Serial Number 565,718, filed November 29, 1944, now Patent Number 2,404,349, granted July 23, 1946, for Valves.

Within each solenoid is an inner tubular member 41, with an inner flange 42, between which and said connecting ring 40, is a sealing ring or gasket 43, to prevent leakage from the valve chamber 11. Coiled springs, as 44, on the end extensions 33 and 34, operate to yieldingly hold said valve members in closed positions, as shown in Fig. 1. When said valves are closed, as shown in Fig. 1, the beveled face of each valve bears on the shoulder or juncture between the bore 11, and the valve chambers 11', 11' thereof, thus closing off communication between the ports 12 or 13, and the passageways 18 or 19, indicated in broken circles in said Fig. 1, and better understood by reference to Fig. 7, in which one of said valves, valve 30, is moved to the left to open communication from the pressure pipe 25, through the connection 23, and thence through to the port 12 and the pipe 12' to the cylinder C, where the piston P is shown moved to the right hand end thereof, with any members to be moved thereby and which is connected therewith. Return fluid will pass through pipe 13' to port 13 thence into the space around the reduced diameter portion 31' of the valve 31 and out port 17, which is open when the poppet portion of said valve is closed, and thence back to the source of supply.

Each of said solenoids 37 and 38 is provided in its outer end with a fixed core, as 45 and 46, and the armatures 35 and 36 are provided with longitudinal, surface grooves 35' and 36' to prevent stalling by reason of air or fluid between the movable armature and the core in each solenoid, as will be clear from the showing in Fig. 7.

Each of said valve members 30 and 31 is provided with a central bore, as 47, open at their adjacent ends, and near their other ends, each of said bores has a lateral port, as 48, opening into the valve chambers 11', 11' as will be clear from Fig. 1. This makes it possible, when one of said valves is open, as seen in Fig. 7, for the hydraulic fluid to enter said lateral port 48, and through said central bore 47, to the space in the valve chamber between said valve members, thus serving to balance said valve member and to equalize the pressure, whereby the solenoid can easily move the valve to open position, and the coiled spring 44, can move the valve to closed position when released.

It will be noted that the threaded connecting ports 12 and 13, as we look down into them, as seen in Fig. 8 where one is shown, has in its bottom three bores into the valve chamber, instead of the usual uniform bore or slot-form of communication. These three bores are designated 49, in all places.

Said valve members are also provided with sealing rings, as 50, around their larger cylindrical portions, and also with the usual small grooves, as indicated by the parallel lines, adjacent the sealing rings 50.

The supply and return connections 23 and 24, for the hydraulic fluid, it will be seen by reference to Fig. 8, are connected to the transverse passageways 16 and 18, by connecting ports designated 16ª and 18ª, in said side plate members, thus connecting the pressure fluid with the enlarged end portions 11' of the valve chamber 11. The opposite side, for the passageways 17 and 19, are the same, but is not shown in Fig. 8. These connections, in effect, are best understood from Fig. 7. The details can be made to suit the construction.

Thus we have provided a valve mechanism in which two valve members 30 and 31 are independently operable to control the flow of a hydraulic operating fluid from a source of supply, through said valve chamber, to and from a place of use, said valve members being operable by electrically responsive means for accomplishing this control of said operating fluid, with the advantages hereinbefore referred, and while we have shown and described in detail one practical form or embodiment of our invention, we do not limit the invention to these details of construction and arrangement, except as we may be limited by the hereto appended claims.

We claim:

1. A solenoid operated flow reversing valve comprising a body member having a bore extending from one end of said body to the other end, a valve seat in each end of said bore, poppet valves in said bore and engageable with said seats, an inlet or pressure port at one side of each of said seats, return fluid ports opening into said bore at the other sides of said seats, motor ports opening into said bore between said return ports and said seats, guiding means on each of said valves engageable with said bore operable upon the unseating of a valve to close the return port associated therewith, and a solenoid connected to each of said valves for selective actuation thereof.

2. In a solenoid operated valve, an elongated valve body having a bore extending from end to end thereof, counterbores at each end of said bore forming a pair of opposed valve seats, a valve seated on each of said seats, each of said valves having a reduced diameter stem portion, extending into said bore, a spool valve member on each of said valve stem portions engageable with the wall of said bore, interconnected pressure ports communicating with said valve chambers, interconnected return ports in communication with said bore adjacent said spool valve members, means operable normally to hold said valves seated and separate solenoid operated means associated with each of said valves for selective operation thereof.

3. In a solenoid operated valve, an elongated valve body having a bore extending from end to end thereof, counterbores at each end of said bore forming a pair of opposed valve seats, a valve seated on each of said seats, each of said valves having a reduced diameter stem portion extending into said bore, a spool valve member on each of said valve stem portions engageable with the wall of said bore, interconnected pressure ports communicating with said valve chambers, interconnected return ports in communication with said bore adjacent said spool valve members, means operable normally to hold said valves seated and separate solenoid operated means associated with each of said valves for selective operation thereof, each of said valves and the associated ports being so constructed and arranged that when the valve is seated the return port associated therewith will be open.

4. In a solenoid operated valve, an elongated valve body having a bore extending from end to end thereof, counterbores at each end of said bore forming a pair of opposed valve seats, a valve seated on each of said seats, each of said valves having a reduced diameter stem portion extending into said bore, a spool valve member on each of said valve stem portions engageable with the wall of said bore, interconnected pressure ports communicating with said valve chambers, interconnected return ports in communication with said bore adjacent said spool valve members, means operable normally to hold said valves seated and separate solenoid operated means associated with each of said valves for selective operation thereof, each of said valves and its associated spool valve member and ports being so constructed and arranged that upon unseating of either valve, the associated return port will be closed by the spool valve member.

5. In a solenoid operated valve, an elongated valve body having a bore extending from end to end thereof, counterbores at each end of said bore forming a pair of opposed valve seats, a valve seated on each of said seats, each of said valves having a reduced diameter stem portion extending into said bore, a spool valve member on each of said valve stem portions engageable with the wall of said bore, interconnected pressure ports communicating with said valve chambers, interconnected return ports in communication with said bore adjacent said spool valve members, a pair of motor ports communicating with said bore at points between each of said return ports and the associated valve seat, means operable normally to hold said valves seated and separate solenoid operated means associated with each of said valves for selective operation thereof.

6. In a solenoid operated valve, an elongated valve body having a bore extending from end to end thereof, counterbores at each end of said bore forming a pair of opposed valve seats, a valve seated on each of said seats, each of said valves having a reduced diameter stem portion extending into said bore, a spool valve member on each of said valve stem portions stem engageable with the wall of said bore, interconnected pressure ports communicating with said valve chambers, interconnected return ports in communication with said bore adjacent said spool valve members, a motor port communicating with said bore at points between each of said return ports and the associated valve seat, means operable normally to hold said valves seated and separate solenoid operated means associated with each of said valves for selective operation thereof, each of said valves and its associated spool valve member and ports being so constructed and arranged that when the valve is seated the return port associated therewith will be in communication with the associated motor port.

7. In a solenoid operated valve, an elongated valve body having a bore extending from end to end thereof, counterbores at each end of said bore forming a pair of opposed valve seats, a valve seated on each of said seats, each of said valves having a reduced diameter stem portion extending into said bore, a spool valve member on each of said valve stem portions stem engageable with the wall of said bore, interconnected pressure ports communicating with said valve chambers, interconnected return ports in communication with said bore adjacent said spool valve members, a pair of motor ports communicating with said bore at points between each of said return ports and the associated valve seat, means operable normally to hold said valves seated and separate solenoid operated means associated with each of said valves for selective operation thereof, each of said valves and the associated pressure, return, and motor ports being so constructed and arranged that upon energization of the associated solenoid, the valve will be unseated effecting communication between the pressure port and the motor port and simultaneous closing of the associated return port.

8. A solenoid operated valve comprising a body member having a bore therein, an enlargement at one end of said bore forming a valve chamber and a seat for a poppet valve, a poppet valve in said chamber, spring means normally holding said valve in engagement with said seat, a valve stem on said valve extending into said bore and having at its extreme end a circular guiding element engaging the wall of said bore, an inlet port communicating with said valve chamber, a return port communicating with said bore at a point adjacent said guiding element, a motor port communicating with said bore between said return port and said valve seat, spring means operable normally to hold said valve seated, and a fluid passage in said valve extending from said valve chamber to the distal end of said guiding element operable to cause substantially equal fluid pressure to be applied to the opposite ends of said valve.

WALTER R. BRANT.
HARVEY G. CHAPMAN, JR.

REFERENCES CITED

The following references are of record in the file of this patent:

UNITED STATES PATENTS

| Number | Name | Date |
|---|---|---|
| 560,550 | Smith | May 19, 1896 |
| 1,509,345 | Dunkley | Sept. 23, 1924 |
| 1,644,714 | Eisenhauer | July 27, 1925 |
| 2,165,001 | Meyer | July 4, 1939 |
| 2,283,810 | Johnson | May 19, 1942 |
| 2,333,670 | Parker | Nov. 9, 1943 |
| 2,366,790 | Horton | Jan. 9, 1945 |